United States Patent
Davis

(10) Patent No.: US 6,498,806 B1
(45) Date of Patent: Dec. 24, 2002

(54) SHARED ASYMMETRIC DIGITAL SUBSCRIBER LINE MODEM

(75) Inventor: Gordon Taylor Davis, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/135,221

(22) Filed: Aug. 17, 1998

(51) Int. Cl.[7] .................................................. H04B 1/38
(52) U.S. Cl. ...................... 375/222; 375/221; 375/220; 370/230
(58) Field of Search ................................ 375/219, 220, 375/222, 231, 240.28, 260; 370/210, 230, 231, 235, 280, 286, 292, 352, 432, 442, 463, 465, 468, 471, 478, 480, 489, 482, 486, 498, 503, 509, 537, 540, 542

(56) References Cited

U.S. PATENT DOCUMENTS

| | | | | |
|---|---|---|---|---|
| 5,521,906 A | * | 5/1996 | Grube et al. ................. | 370/252 |
| 5,557,612 A | | 9/1996 | Bingham ...................... | 370/71 |
| 5,608,725 A | | 3/1997 | Grube et al. ................. | 370/337 |
| 5,756,280 A | * | 5/1998 | Soora et al. ................. | 725/116 |
| 5,825,826 A | * | 10/1998 | May et al. ................... | 375/295 |
| 5,933,454 A | * | 8/1999 | Cioffi .......................... | 370/480 |
| 5,991,311 A | * | 11/1999 | Long et al. .................. | 370/524 |
| 6,188,669 B1 | * | 2/2001 | Bellenger .................... | 370/230 |
| 6,243,394 B1 | * | 6/2001 | Deng ........................... | 370/466 |

OTHER PUBLICATIONS

Brochure, LoopRunner™ ADSLAM™ with QuickDial™ On–Demand ADSL, http://www.netspeed.com/looprunmultiplex.html (1997).

* cited by examiner

Primary Examiner—Chi Pham
Assistant Examiner—Khanh Cong Tran
(74) Attorney, Agent, or Firm—J. Bruce Schelkopf; Myers, Bigel, Sibley & Sajovec, PA

(57) ABSTRACT

Multi-drop Asymmetrical Digital Subscriber Loop (ADSL) modems have at least two sets of digital front end circuitry which allow for simultaneous connections to at least two local loops. A shared DSL modem is operably associated with each of the two sets of digital front end circuitry and transmits and receives data to and from the digital front end circuitry. A digital interface is operably associated with the shared DSL modem and is configured to communicate with an external network.

41 Claims, 9 Drawing Sheets

SHARED ASYMMETRIC DIGITAL SUBSCRIBER LINE MODEM

FIELD OF THE INVENTION

The present invention relates generally to communications systems and, more particularly, to discrete multi-tone communications systems and digital subscriber line communication systems.

BACKGROUND OF THE INVENTION

Remote client personal computers (PCs) are typically connected to the Internet over a telephone network of twisted-pair transmission lines via analog modems, as illustrated in FIG. 1. Unfortunately, analog modem speeds are currently limited to 56 thousand bits per second (56 Kbps) because of various constraints of existing telephone networks.

Asymmetrical Digital Subscriber Line (ADSL) technology is currently being developed to extend bandwidth over twisted-pair transmission lines by an order of magnitude. ADSL is based on a discrete multi-tone (DMT) transmission system. ADSL transmission rates over twisted pair transmission lines can reach as high as 8 million bits per second (8 Mbps) downstream (i.e., towards a client PC) and up to 256 Kbps upstream (towards a server). Data transmission rates for ADSL are substantially higher in the downstream direction than in the upstream direction. The asymmetric nature of ADSL fits well with data delivery requirements of the Internet. More data is typically transmitted downstream to a client PC than upstream from a client PC to a server.

Unfortunately, a significant problem currently plaguing the implementation of ADSL is the bandwidth burden placed on a telephone network by ADSL as illustrated in FIG. 2. In FIG. 2, lines 20 correspond to individual analog lines, such as local subscriber loops or lines and plain old telephone system (POTS) connections to a telephone company central office (CO) switch. Lines 22 correspond to T-1 lines (i.e., lines having bandwidth capabilities of 1.544 Mbps and capable of carrying 24 digitized voiceband connections). Lines 24 correspond to T-3 lines-(i.e., lines having bandwidth capabilities of 28 T-1 lines and that are time-division multiplexed).

Although 24 analog POTS connections can be handled by a single T-1 line, 24 ADSL connections utilize almost the entire bandwidth of a T-3 line. This bandwidth constraint is further complicated by the fact that many analog subscriber lines may not terminate at a CO switch. Analog subscriber lines may terminate in remote locations, such as a manhole or utility box in a neighborhood, where a subscriber line is digitized and then routed to a CO switch via a T-1 or T-3 line. Increasing bandwidth for these remote links may be costly and may complicate implementation of ADSL.

In addition, current ADSL implementations typically include a dedicated pair of ADSL modems for each subscriber line. This is in contrast to voice-band modems, where a server only utilizes dedicated modems for each active connection. Requiring a dedicated pair of ADSL modems for each subscriber line may add significantly to the cost of ADSL implementation by telephone service providers.

Various solutions have been proposed to alleviate bandwidth constraints and thereby facilitate implementation of ADSL technology. One solution involves statistical multiplexing at the remote site. Another solution proposes terminating multiple ADSL subscriber lines in a single shared modem at the client side. This may simplify hardware requirements on the telephone network side of each ADSL subscriber line because each subscriber line may share a high-speed transmitter. A single shared modem eliminates the need for separate ADSL modems for respective ADSL subscriber lines.

Unfortunately, a limitation of a single shared ADSL modem is that modems on the other end of subscriber lines connected to the shared modem may need to receive the same signal. Accordingly, the bandwidth of the transmitted signal within each frequency band may need to be reduced to accommodate the subscriber line in the group with the lowest bandwidth within each of these frequency bands. Accordingly, the net bandwidth that can be exploited by a shared modem on the server end may be less than that of a single modem on the worst line.

Various ways of overcoming limitations with shared ADSL modems have been proposed. For example, U.S. Pat. No. 5,557,612 to Bingham relates to a system for establishing communications between a central unit and a plurality of remote units wherein access requests include an identification of each remote unit. A particular subchannel is allocated to the remote units by the central unit in an ADSL application. Units requiring bandwidth already allocated to other clients may be denied service. U.S. Pat. No. 5,608,725 to Grube et al. relates to establishing a communications system wherein a primary site is coupled to a plurality of secondary sites via low pass transmission paths. However, only a single secondary site may be active at a time. Furthermore, the primary site allocates carrier channels of the inbound and outbound low pass transmission paths.

SUMMARY OF THE INVENTION

In view of the above discussion, it is an object of the present invention to facilitate the implementation of ADSL by including statistical multiplexing within an ADSL modem.

It is another object of the present invention to facilitate the implementation of ADSL without requiring a separate ADSL modem at each end of a subscriber loop.

It is another object of the present invention to help lower costs associated with ADSL implementation.

These and other objects of the present invention are provided by a multi-drop Asymmetrical Digital Subscriber Loop (ADSL) modem having at least two sets of digital front end circuitry which allow for simultaneous connections to at least two local loops. A shared DSL modem is operably associated with each of the two or more sets of digital front end circuitry and transmits and receives data to and from the digital front end circuitry. A digital interface is operably associated with the shared DSL modem and is configured to communicate with an external network.

By providing multiple analog front ends and shared modem components, the present invention allows for multiple ADSL local loops to be provided by a single modem. The shared components reduces the cost of each connection by reducing the number of components required for the modem. Furthermore, space constraints may be overcome by allowing multiple local loops to connect to a single modem. Accordingly, the total number of modems required and the total space and power consumption needed to support the modems may be reduced by the multi-drop ADSL modem of the present invention.

The digital front end circuitry may include a transmit isolation buffer associated with each local loop. The transmit isolation buffer isolates transmitted communication signals of the local loops from each other and is operably associated with a transmitter portion of the shared DSL modem. The digital front end circuitry may also include a receive isolation buffer associated with each local loop which isolates received communication signals of the local loops from each other and which is operably associated with a receiver of the shared DSL modem.

The digital front end circuitry may also include a receive filter and a sample and hold circuit associated with each receive filter. The receive filter is operably associated with the receive isolation buffer for filtering signals received by the analog front end circuitry. The sample and hold circuit associated with each receive filter receives filtered signals from the corresponding receive filter. An analog to digital converter may be associated with each sample and hold circuit to receive a held signal from the corresponding sample and hold circuit and convert the analog signal to a digital signal.

The shared ADSL modem may include a receiver having a multiplexer and an analog-to-digital converter. The multiplexer receives an output of the receive filter of each local loop and provides one of the outputs of one of the receive filters as a multiplexer output. The analog-to-digital converter receives the multiplexer output and converts the multiplexer output to a digital signal. The receiver may also include a timing equalizer and a memory device. The timing equalizer utilizes local loop specific equalizer information to equalize the digital signal from the analog-to-digital converter and to time-domain equalize the digital signal to provide an equalized digital signal. The memory device is operably associated with the timing equalizer and stores local loop specific equalizer coefficients.

The receiver may further include a serial to parallel converter, a Discrete Fourier Transform circuit, a symbol detector, and a memory device operably associated with the symbol detector. The serial to parallel converter converts the equalized digital signal from a serial signal to a parallel signal so as to provide a parallel digital signal. The Discrete Fourier Transform circuit transforms the parallel digital signal from a time domain signal to a frequency domain signal so as to provide digital frequency coefficients. The symbol detector receives the digital frequency coefficients and detects symbols from the frequency domain coefficients based on local loop specific symbol information to provide client specific symbols. The memory device operably associated with the symbol detector stores local loop specific symbol information.

The receiver may also include a decoder and a memory device operably associated with the decoder. The decoder receives client specific symbols from the symbol detector, descrambles, provides Reed-Solomon decoding and de-interleaves the symbols based on client specific information to provide client specific data. The memory device operably associated with the decoder stores the client specific information.

The ADSL modem may also include a symbol buffer and a packet buffer for each local loop. The symbol buffer receives symbols from the symbol detector and provides symbols to the decoder. The packet buffer receives packets from the decoder.

The ADSL modem may also include a transmitter having an encoder, a memory device operably associated with the encoder, a symbol mapper, and a memory device operably associated with the symbol mapper. The encoder receives client specific symbols for transmission on a local loop and scrambles, provides Reed-Solomon encoding and interleaves the symbols based on client specific information to provide client specific symbol data. The memory device operably associated with the encoder stores the client specific information. The symbol mapper receives client specific symbol data and maps the client specific symbol data to frequency domain symbols based on local loop specific frequency information to provide local loop specific symbol data. The memory device operably associated with the symbol mapper stores local loop specific frequency information.

The transmitter may also include an Inverse Discrete Fourier Transform circuit, a parallel to serial converter, a digital to analog converter, and a transmit filter. The Inverse Discrete Fourier Transform circuit transforms the local loop specific symbol data from frequency domain data to a time domain signal so as to provide parallel digital symbol data. The parallel to serial converter converts the parallel digital symbol data from a parallel signal to a serial signal so as to provide a serial digital signal. The circuit also adds a framing bit and a cyclic prefix. The digital to analog converter converts the serial digital signal to an analog signal. The transmit filter provides a filtered transmit signal to the transmit isolation buffers.

According to another aspect of the present invention, methods and computer program products are provided for allowing multiple simultaneous local loops to connect to a single ADSL modem. Operations include isolating the local loops from one another, storing loop dependent information for each connected local loop, and communicating with each local loop utilizing the loop dependent information.

DETAILED DESCRIPTION OF THE INVENTION

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

ADSL

As is known to those skilled in this art, an ADSL communication system includes an ADSL transceiver on each end of a subscriber line. In general, the ADSL transceivers of a subscriber line communicate with each other to establish a spectral response of the subscriber line. Once spectral response information is exchanged, transmission of data typically begins. The sending ADSL transceiver converts data provided in digital format, such as from a video camera, or internet web site images into a sequence of DMT symbols and conveys the DMT symbols to the other ADSL transceiver over the subscriber line. Upon receiving a sequence of DMT symbols, the receiving ADSL transceiver recaptures and reroutes the digital data, for example, to a user via a display screen or monitor. Using ADSL technology, high bandwidth data can be delivered to client PCs from a server using existing twisted pair transmission lines. ADSL is described in detail in the American National Standards Institute Draft Standard for Telecommunications—Network and Installation Interfaces—Asymmetrical Digital Subscriber Line (ADSL) Interface - ANSI Document No. T1.413, which is incorporated herein by reference in its entirety.

Shared ADSL Modem

Figure 1:
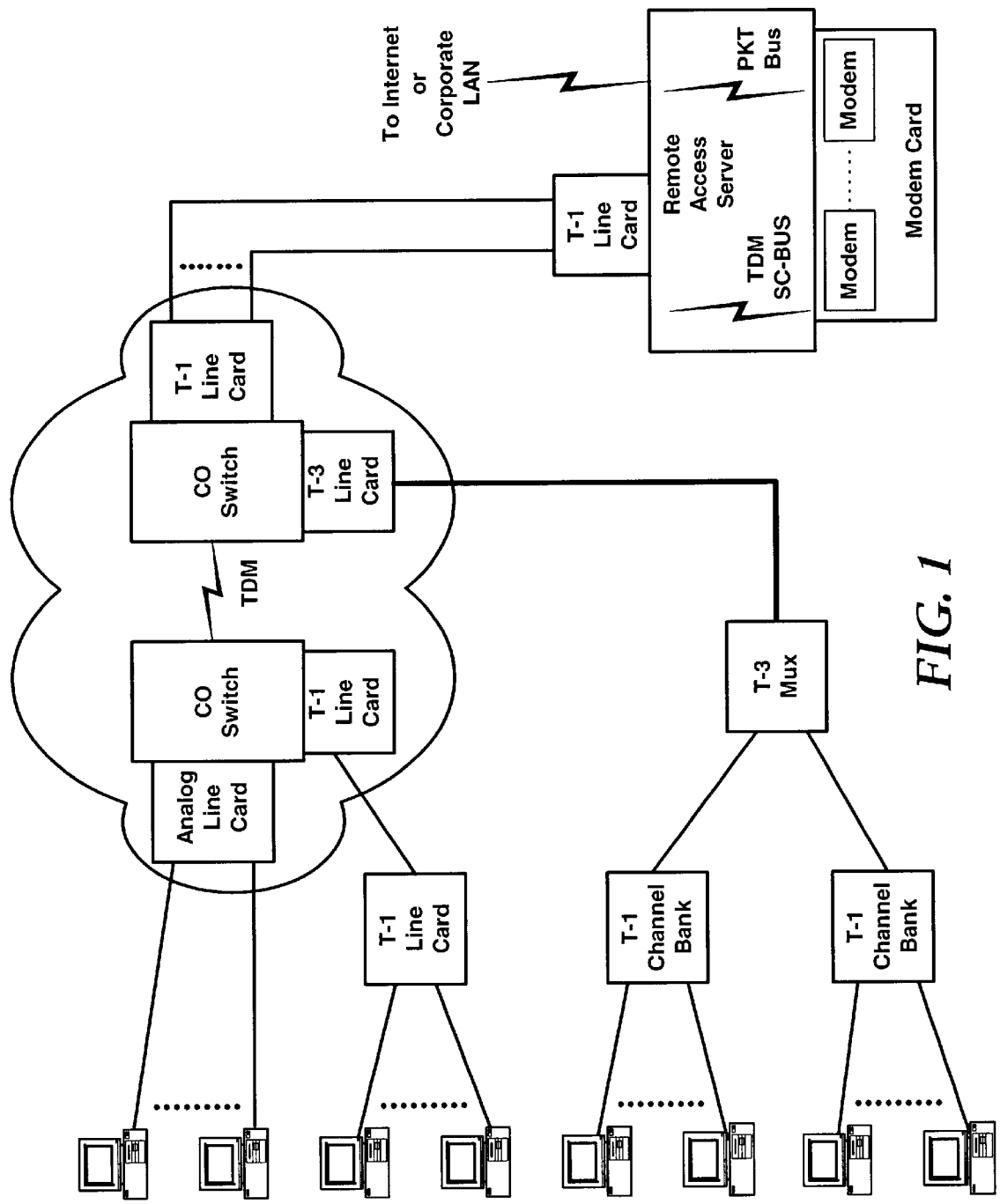
FIG. 1 illustrates an exemplary telephone network of twisted-pair transmission lines and analog modems.
Figure 2:
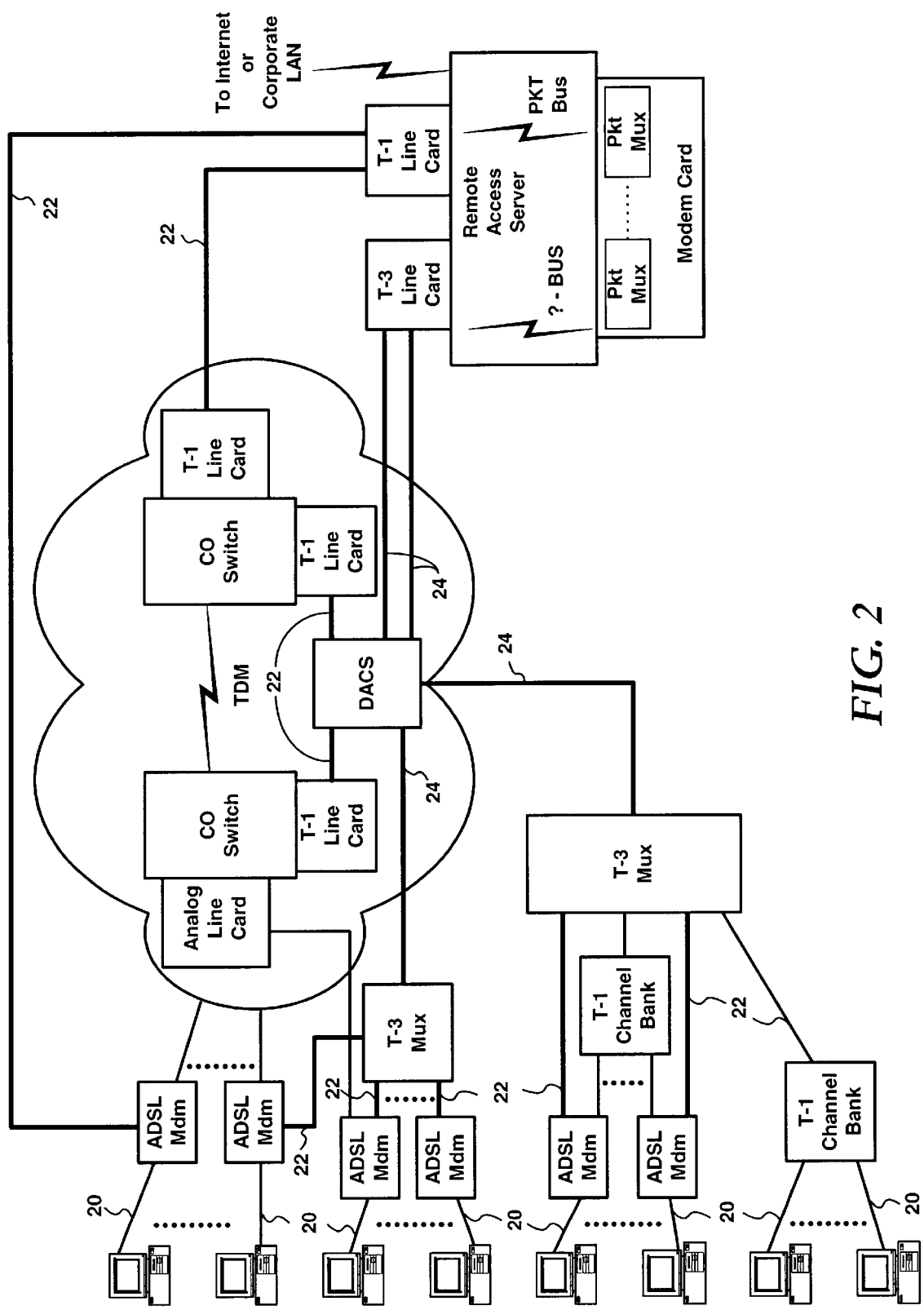
FIG. 2 schematically illustrates bandwidth burden imposed on a telephone network by an ADSL implementation.
Figure 3:
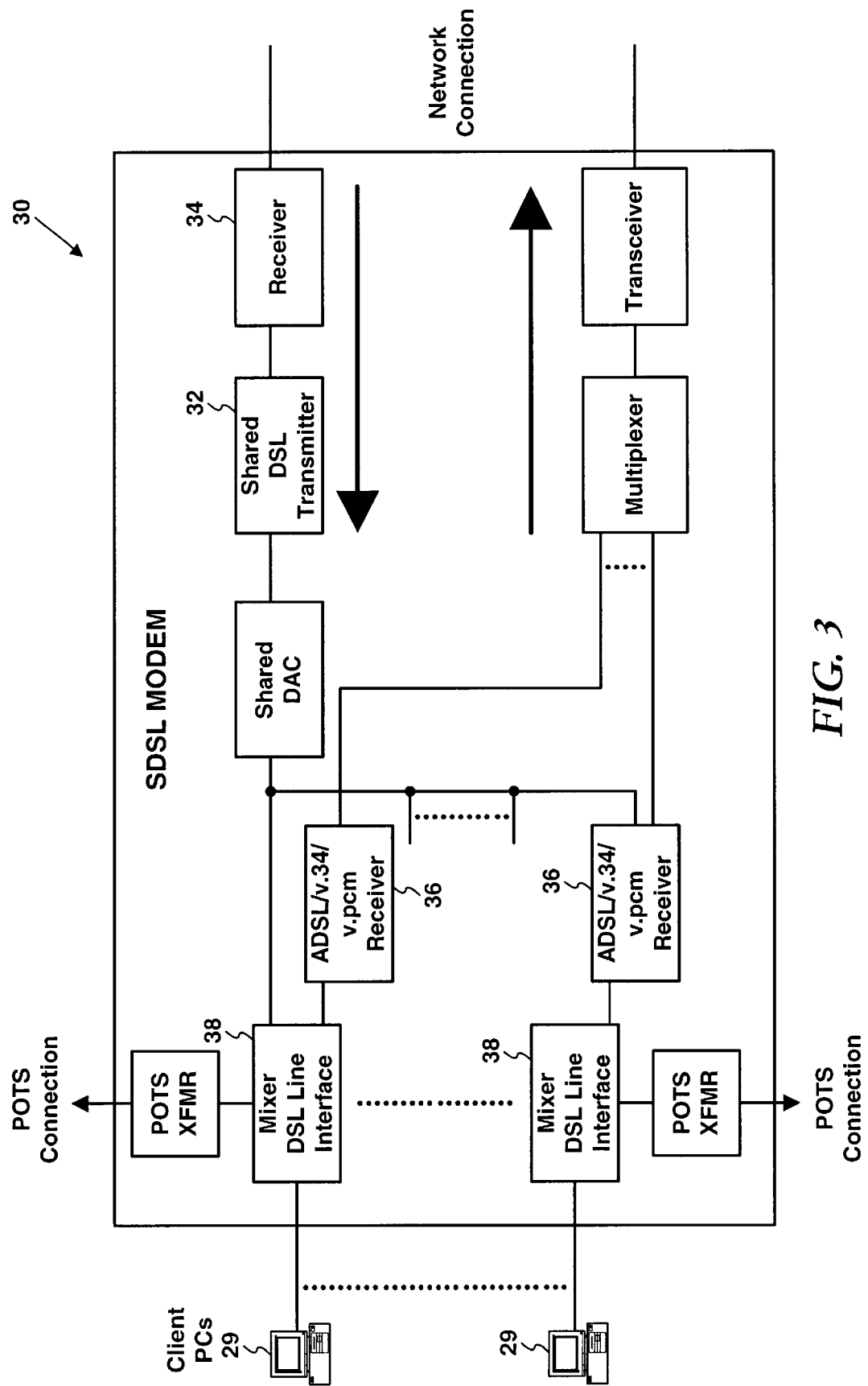
FIG. 3 schematically illustrates a shared access ADSL modem having a single high-speed shared DSL transmitter configured to handle multiple subscriber lines.

Referring to FIG. 3, a shared access ADSL modem 30 for use with the present invention is illustrated. The illustrated modem 30 has a single high-speed shared DSL transmitter 32 configured to handle multiple subscriber lines. The illustrated shared DSL transmitter 32 receives data from a network server connected by a high-speed communications line through a receiver circuit 34. The shared DSL transmitter 32 provides typical modem transmitter functions including error recovery protocols, line coding, filtering, modulation, and the like. The shared DSL transmitter 32 is also configured to embed a unique identifier within each signal frame transmitted to a respective remote modem.

Each subscriber line typically requires its own line interface circuit 38, which isolates the source of the transmit signal from the subscriber line itself in order to keep the POTS and received modem signals for each subscriber line isolated. This line interface circuit 38 also provides the mechanism traditionally included within ADSL modems to tap off the analog POTS telephone bandwidth for traditional telephony connections. Because each client PC 29 connected to the shared access ADSL modem 30 receives the same signal, each client PC ADSL modem examines the incoming signal to filter out packets destined for other client PCs. Such filtering may be accomplished by accepting only packets which have an identifier corresponding to a preassigned address for a particular client PC.

On the upstream side of each subscriber line is a receiver 36, as illustrated. Each modem receiver 36 may be similar to a V.34, V.PCM modem, or ADSL modem receiver, except that the signal is converted from a high frequency pass band to a base band signal via a mixer in the line interface circuit 38 before processing by the modem.

Discrete Multi-Tone Data Transmission

Figure 4:
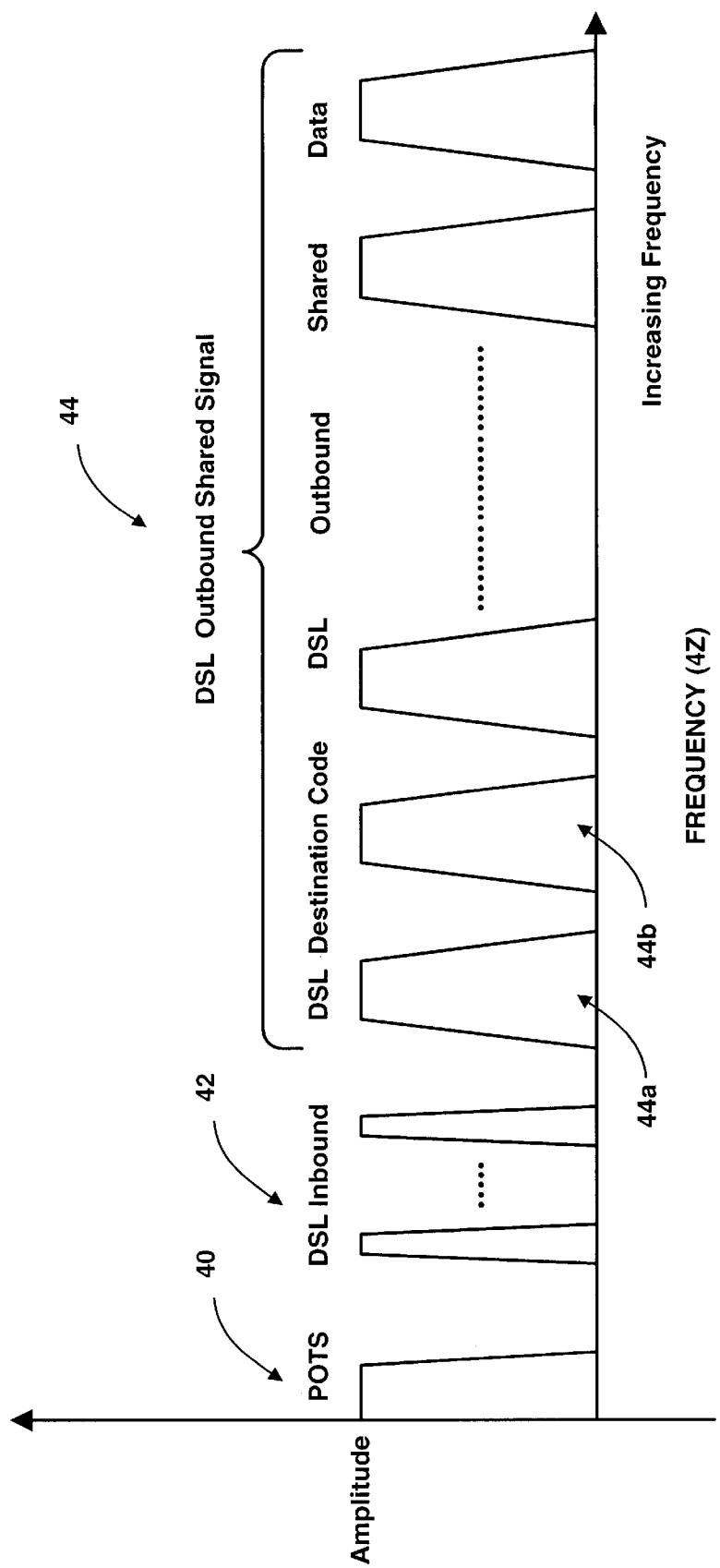
FIG. 4 schematically illustrates frequency bandwidth allocation for DMT modulation.

Many current ADSL implementations utilize a modulation scheme known as DMT modulation. A generalized illustration of frequency bandwidth allocation for DMT modulation is schematically shown in FIG. 4. The low frequency range 40 is reserved for POTS transmissions. Frequency ranges higher than the POTS frequency range 40 are used for ADSL transmissions. In FIG. 4, these high frequency ranges are divided into a group of frequency bands 42 for upstream signals and multiple frequency bands 44 for downstream signals. DMT modulation is also applicable to systems requiring an echo canceller where upstream frequency bands and downstream frequency bands share a common frequency range. The present invention is equally applicable to systems utilizing an echo canceller.

According to the present invention, within the multiple frequency bands 44 for downstream signals, a shared ADSL modem uses various line probing techniques to determine for each frequency band what data rate can be supported. The transmitter then splits-up the signal among the supported frequency bands according to the ability of each frequency band to support data throughput.

The present invention adapts the use of the multiple downstream frequency bands 44 to achieve optimum performance within a system which shares a high-speed digital subscriber loop transmitter among multiple subscriber lines. A small number of the downstream frequency bands 44 are allocated as carriers for destination codes of downstream or remote modems. In the illustrated embodiment of FIG. 4, frequency bands 44a and 44b are allocated as destination code carriers. Preferably, frequency bands for use as destination code carriers are selected on the basis of consistent throughput capabilities.

An ADSL frame is an amount of data that fits into one Fast Fourier Transform (FFT). Each ADSL frame can have a different destination code. There are alternate ways of embedding a control channel, which carries this destination code. One way is to add a control channel to a time domain signal. Another way involves the use of bursts of frames all destined for the same client. In this case, a destination code only needs to be sent in the first frame of an initial burst.

According to the present invention, each of the client PC modems sharing a common server modem has a unique destination code, either assigned statically or negotiated at the beginning of a session, such as during a communications handshake. One or more destination codes may also be assigned for use during the initial phases of a connection when destination codes are negotiated. All client receivers will process the signal through a FFT. A receiver in each client PC modem examines a destination code within a carrier frequency band or bands during each symbol interval and processes data in other frequency bands 44 only if the destination code matches a preassigned destination code. According to the present invention, a particular client PC modem can ignore downstream frequency bands 44 containing data when a destination code does not match the assigned destination code of the particular client PC modem (i.e., data destined for another client PC).

The present invention can allow each subscriber line to "tune" its supported frequency bands to optimize bandwidth of a specific copper line, because a destination code will identify a symbol interval as only being valid for a specific subscriber line. Preferably, the shared server ADSL modem tracks which downstream frequency bands 44 are usable for each client PC modem and dynamically adjusts a modulated transmit signal based on which client modem is the intended recipient of the data.

Figure 5:
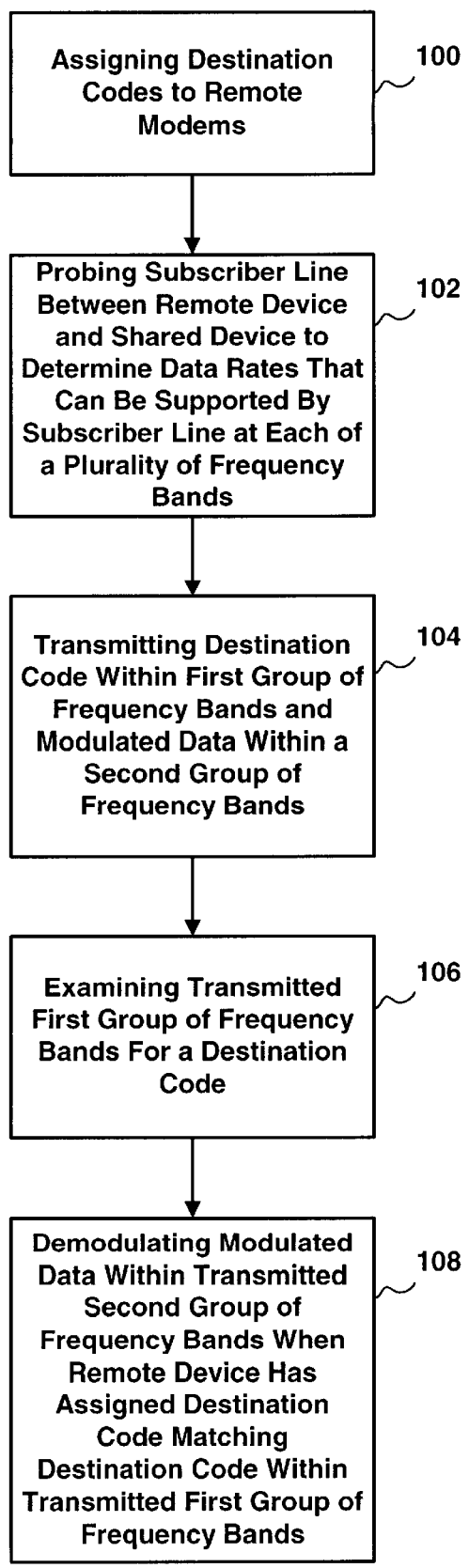
FIG. 5 schematically illustrates operations for carrying out aspects of the present invention.

Referring now to FIG. 5, operations for carrying out aspects of the present invention are schematically illustrated.

Each remote modem is assigned a unique destination code (Block 100). The assignment of unique destination codes may be performed statically or dynamically during a communications handshake between each remote modem and the shared modem.

During a communications handshake between a remote modem and the shared modem, the subscriber line connected to the particular remote modem is probed to determine data rates that can be supported at various frequency bands (Block 102). The shared modem then transmits modulated data to each respective remote modem using destination codes per Block 100 above to control the desired recipient using only frequency bands to which the addressed subscriber line has been "tuned". Accordingly, data is preferably transmitted to each remote modem at an optimum data rate for each remote modem, and not at a sub-optimum data rate.

During actual data transmission between a shared server ADSL modem and a plurality of remote ADSL client modems, in each ADSL frame interval, a destination code is transmitted in a first group of frequency bands and modulated data is transmitted in at least one second group of frequency bands, different from the first group of frequency bands (Block 104). Each remote ADSL modem examines a transmitted first group of frequency bands to determine if the first group of frequency bands contains a destination code matching a preassigned destination code of the remote modem (Block 106). If a matching destination code is found, data contained within the second group of frequency bands is demodulated by the remote ADSL modem for use by a respective client PC (Block 108).

It will be understood that each block of the flowchart illustrations of FIG. 5 and combinations of blocks in the flowchart illustrations of FIG. 5, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 6:
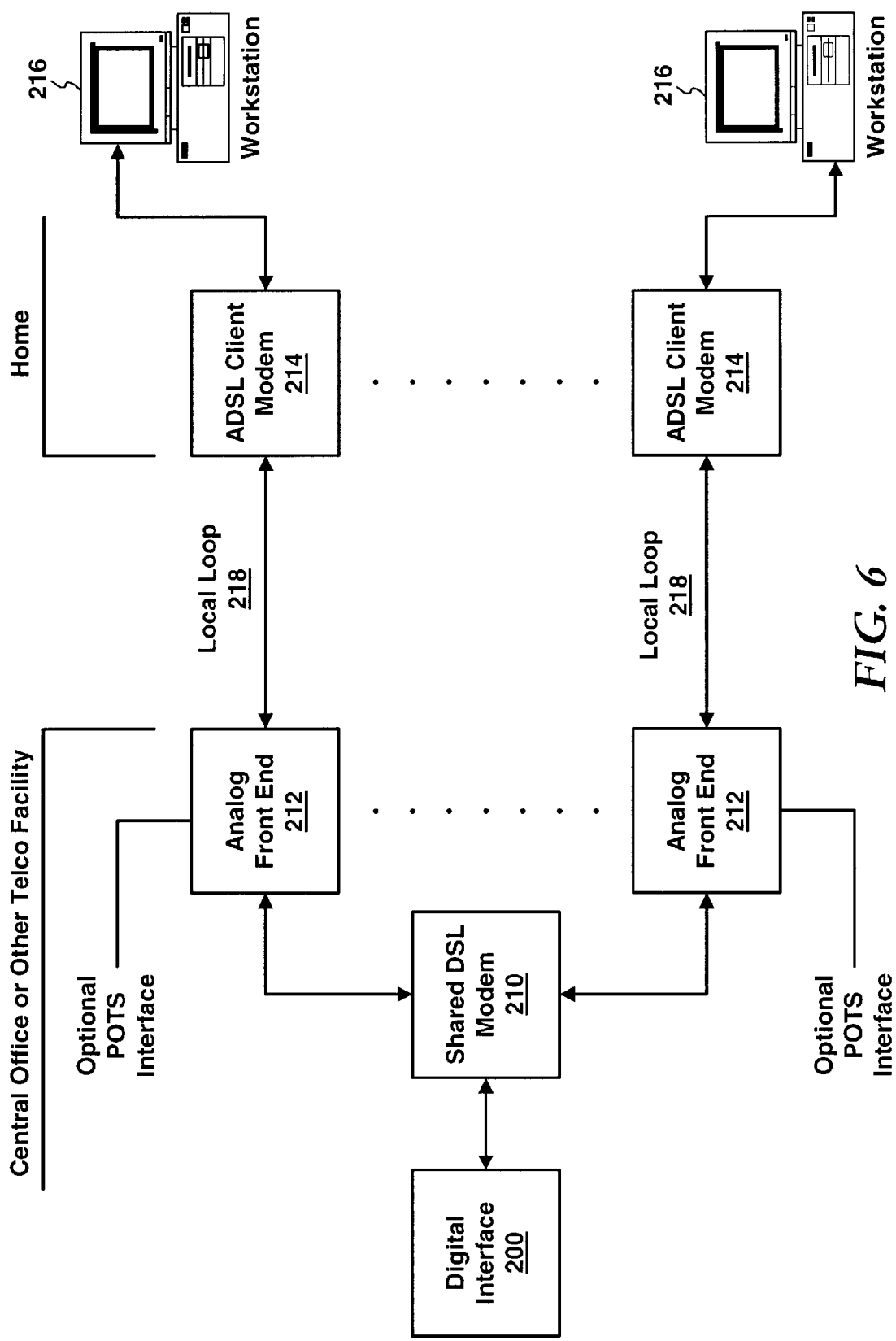
FIG. 6 is a block diagram of a system including a multi-drop server modem connected to multiple remote client modems according to the present invention.

FIG. 6 illustrates one embodiment of a multi-drop server modem connected to multiple client modems according to the present invention. As seen in FIG. 6, multiple workstations 216 may use individual ADSL modems 214 to connect to individual analog front ends 212 of a shared ADSL server modem 210 via individual twisted pair local loops 218. The shared ADSL modem 210 then communicates with the digital interface 200 which provides the information from the multiple local loops connected to the analog front ends 212 to another network or processor such as a digital telephone network or Internet Service Provider (ISP).

Because of the asymmetric nature of ADSL, a server function is essentially a mirror image of the corresponding client function. While the client has a high-speed receiver and a lower speed transmitter, the server transmitter matches the high speed of the client receiver, and has a lower speed receiver. As will be seen in the description to follow, the client modem requires only minor changes to be compatible with a multi-line server modem. The analog front end of the multi-line server modem is significantly more complex than a single line server modem as an analog front end 212 is provided for each local loop. The shared functions of the ADSL modem also utilize additional working storage to handle client-specific state variables and coefficients.

Figure 10:
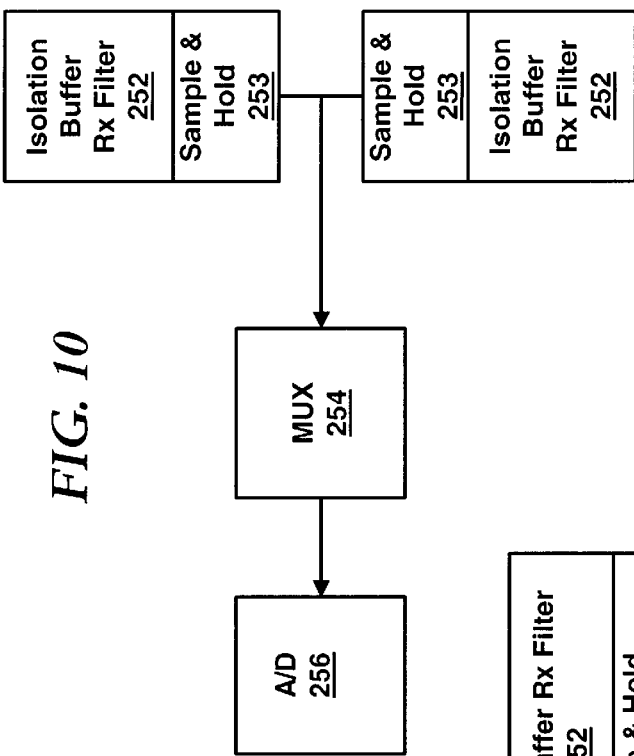
FIG. 10 is a block diagram of a particular embodiment of an analog front end for a multidrop server modem.
Figure 9:
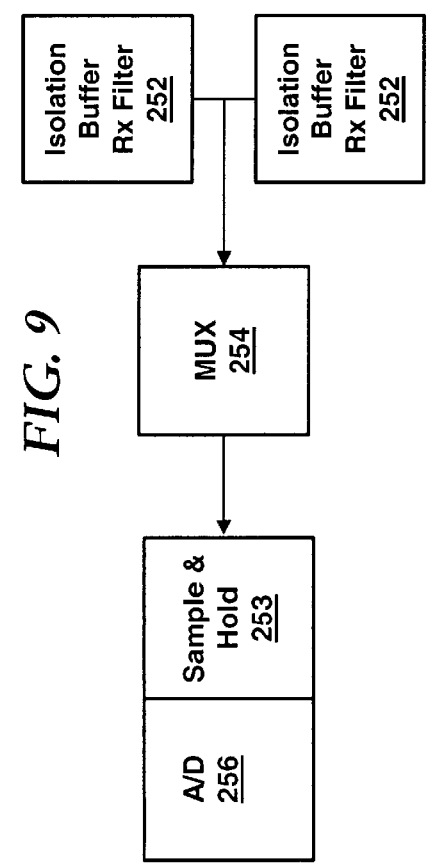
FIG. 9 is a block diagram of a particular embodiment of an analog front end for a multi-drop server modem.
Figure 11:
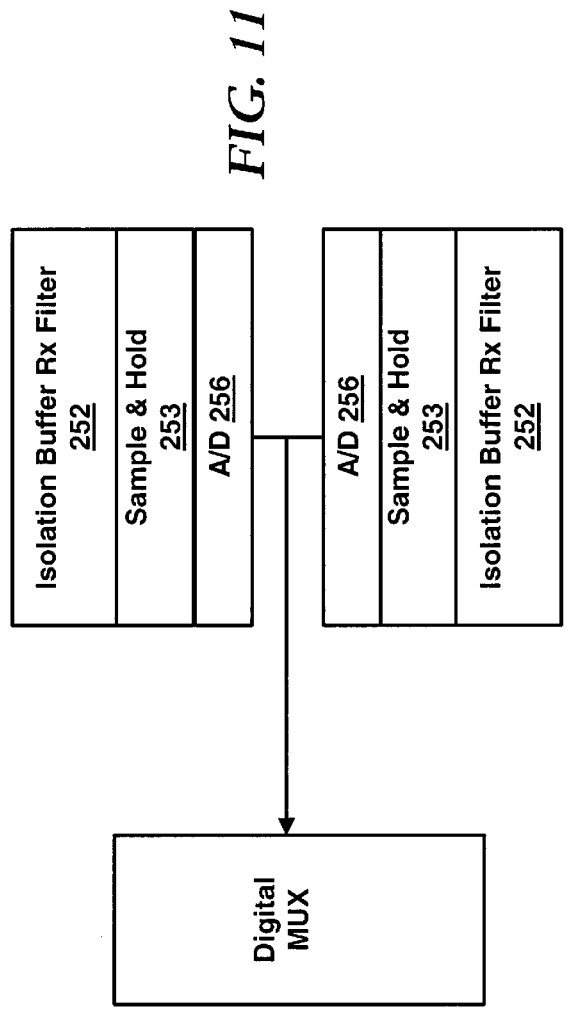
FIG. 11 is a block diagram of a particular embodiment of an analog front end for a multidrop server modem.

The analog front ends 212, preferably include separate splitters for POTS connections and isolation buffers to prevent signals from one client from coupling into another line. Each analog front end 212 also preferably includes a dedicated analog receive filter. However, in alternative embodiments, the analog front end may include an analog multiplexer (Mux) to a common sample-hold circuit 253 followed by a common Analog-to-Digital converter 256 (see FIG. 9). Alternatively, multiple sample-hold circuits 253 may be used with an analog Mux to a common Analog-to-Digital converter. FIG. 10, a third alternative uses multiple Analog-to-Digital converters, with multiplexing accomplished in the digital domain FIG. 11.

Alternatively, the complexities of sharing the upstream bandwidth may be reduced by implementing a separate complete receiver for each client as shown in FIG. 3. Since the server receiver operates at ⅛ the sample rate of the transmitter, a server system with one transmitter and eight receivers would require less than ¼ the processing required to handle the same 8 clients with individual ADSL modems. Furthermore, this can be done without affecting bandwidth back to the digital interface, since it simply compensates for the asymmetric bit rate of the modems. While this alternative may increase the cost of a fully shared server modem, it may be a reasonable alternative if real-time traffic (i.e. voice or video conferencing) is a significant requirement for the service. Furthermore, the same hardware could potentially adapt to either by using different microcode loads, allowing the service provider to tune the modem density according to the level of service required.

While the above discussion described the multi-drop modem as having 8 clients per server modem, the number of clients supported by one server modem will be determined by several factors, regardless of whether the receiver function is dedicated per client or shared across a number of clients. For example, the additional memory required per client and the bandwidth allocated to the control channel carrying addressing information to select a specific client may limit the number of clients which can be supported. However, the number of clients per shared modem may ultimately be limited by individual user's expectations for level of service (i.e. response time) which limits the number of clients. Since different service providers may have different ideas as to the level of service their customers expect, the number of clients per server modem is preferably flexible to allow customization for particular users.

Figure 7:
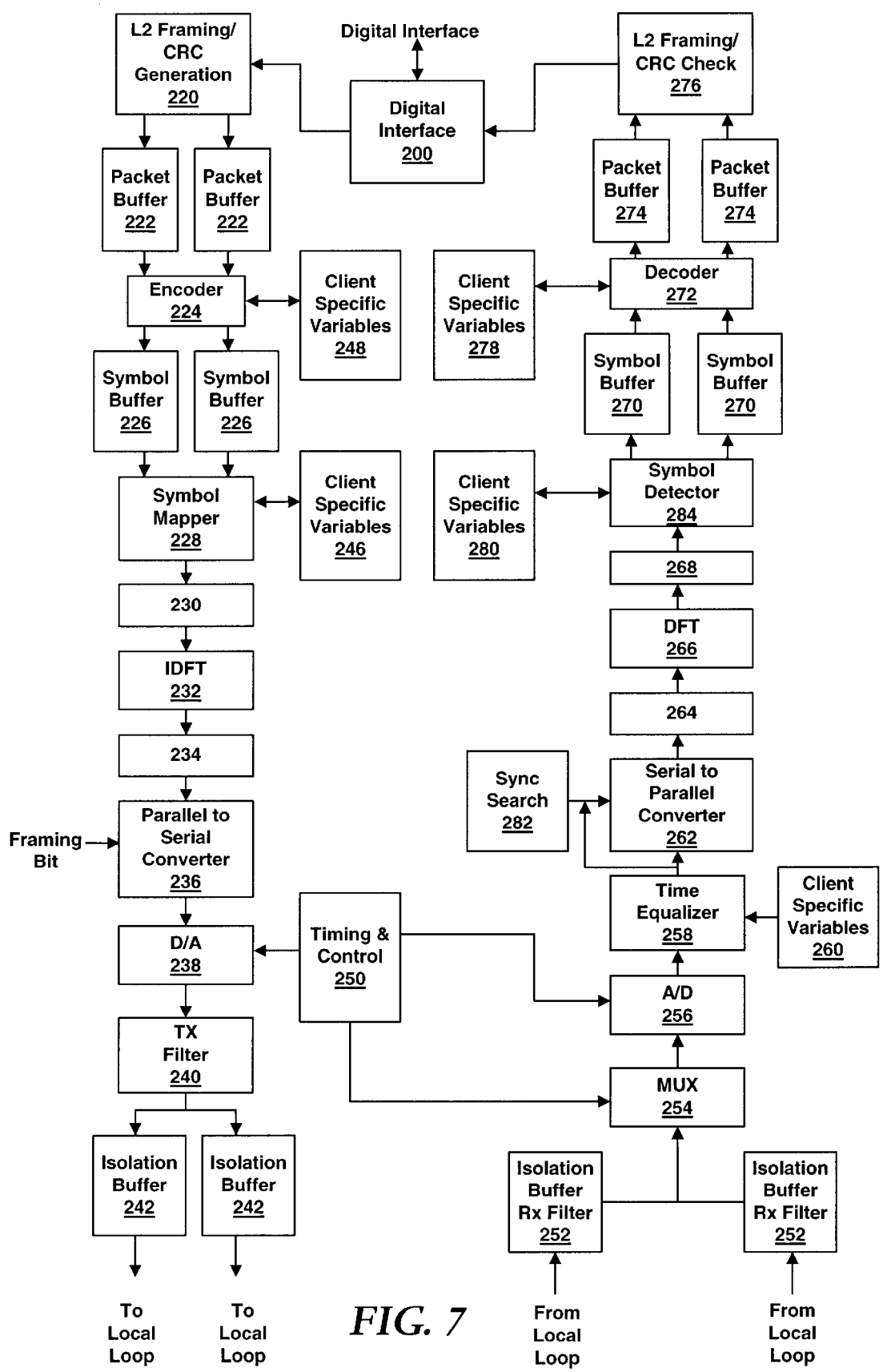
FIG. 7 is a block diagram of a particular embodiment of a multi-drop server modem according to the present invention.

FIG. 7 illustrates a particular embodiment of a shared DSL server modem according to the present invention. As will be appreciated by those of skill in the art, the embodiment illustrated in FIG. 7 may be modified as described above with respect to the division between local loop specific and shared components.

As seen in FIG. 7, the multi-drop ADSL modem according to one embodiment of the present invention includes a digital interface 200 which allows connectivity to any device capable of communicating over the digital interface 200. The digital interface 200 is bidirectional in that it receives data from the receive section or sections of the modem or provides data to the transmitter portion of the modem.

The type of digital interface 200 is not dependent on whether the modem supports multiple clients. For example, the digital interface may be a high-speed parallel bus which supports Direct Memory Access (DMA) or Bus Master data transfers, such as the PCI bus. Such modems may be used in an installation with multiple slots for ADSL modems, one or more slots for upstream connections, and a slot (or backplane) containing a system control processor and memory. In such a system, the multi-line modem may reduce loading and simplified Bus Master arbitration (due to fewer devices requiring access) for a system which supports a given number of client modem connections. Alternatively, for installations where a small number of clients are geographically isolated, the multi-line modem may be able to utilize a serial interface directly to link to a remotely located concentrator, since multiple clients are inherently already statistically multiplexed.

In light of the above discussion, the present invention should not be limited to any particular digital interface. Any number of suitable bus schemes and interfaces known to those of skill in the art may be used with the present invention to allow communication between the multi-drop ADSL modem and other devices.

The digital interface provides information to a L2 Framing and CRC Generation function 220. A single L2 Framing/CRC Generation function 220 can be shared among multiple connections, leading to an imple-mentation which is essentially the same as required for a single line modem. Each L2 Frame will be processed completely and placed in a packet buffer 222 before starting the next frame. This avoids a requirement of saving and restoring client specific intermediate results. Supporting multiple connections may require more packet buffers than required for the single line case. As illustrated in FIG. 7 separate buffers 222 per connection would be the upper limit required. However, depending on the mechanism used to control data flow through the physical layer, the number of packet buffers may be reduced significantly below that level. Packet buffering requirements may actually approach the requirements for a single line modem if the L2 frame (equal to 69 physical layer frames) is chosen as the smallest entity directed to a specific connection.

The packet buffers 222 provide packets of data to an encoder 224. The encoder 224 scrambles, Reed-Solomon codes and interleaves the packets. Scrambling, Reed-Solomon Encoding, and Interleaving processes should be essentially the same as that required for a single line server modem, since each L2 frame could be processed completely before moving to the next. CRC generation should coordinate multiple packet buffers. Tone ordering is dependent on learned line characteristics, and thus is preferably done differently for each client connection. Thus, client specific variables 248 are stored and provided to the encoder 224. However, the same routine may be used for each connection by providing the client specific (i.e. local loop specific) information to the encoder 224 for use by the routine.

After the encoder 224, the resulting symbols are provided to the symbol buffers 226. As with the packet buffers 222, the upper limit for symbol buffers should be the total number of connections allowed, however fewer may be used.

The symbol buffers 226 provide the symbols to the symbol mapper 228. Symbol Mapping and gain scaling are also dependent on learned line characteristics, and thus must be done differently for each client connection. As with encoding, conventional symbol mapping may be used, however, client specific variables are used for the mapping. A single routine may process multiple connections by accessing the client specific state variables 246. The symbol mapper 228 uses the client specific information to map the symbols to the frequencies of the multi-tone transmission. Thus, each client may have specific symbol values for each frequency which would be reflected in the stored client specific (i.e. local loop specific) variables 246.

The output of the symbol mapper 228 may then be provided to a 256 complex symbol buffer 230 which outputs the complex symbols to the Inverse Discrete Fourier Transform (IDFT) circuit 232. The IDFT 232 of the present invention may be identical to that of a conventional ADSL modem. The IDFT 232 converts the complex frequency domain symbols to real time domain symbols in accordance with well-known Fourier Transform processes. The real symbols are provided to a 512 symbol buffer 234 which then provides them to the parallel to serial converter 236 which may insert the framing bit. The parallel to serial conversion and insertion of the framing bit and cyclic prefix may be identical to that of a conventional single line ADSL modem.

The parallel to serial converter provides the serial information to the Digital to Analog converter (D/A) 238 which converts the digital signal to an analog signal. The analog signal is provided to the transmit filter 240 which provides the filtered signal to an isolation buffer 242 for each local loop. The isolation buffers reduce the likelihood of each local loop interfering with other local loops. From the isolation buffer 242 the analog signal is provided to the local loop.

As will be appreciated by those of skill in the art, the present invention utilizes a client identifier or local loop identifier throughout the transmission processes described above. Thus, each of the functions, such as the encoder 224 and the symbol mapper 228 may utilize the identifier to select the client or local loop specific information to use in their processing. Such an identifier may take many forms, such as a header in the data or as a discrete signal decoded from information in the data received by the digital interface 200. Accordingly, the present invention should not be construed as limited to any particular method of providing identification of the local loop associated with data to the various functions of the transmitter of the ADSL modem.

The receiver of FIG. 7 receives signals from the local loops at isolation buffers 252. The isolation buffers serve to isolate each local loop from the other. The isolation buffers 252 may provide the received signals to an analog multiplexer 254 which provides one of the signals to an analog to digital converter 256. As described above, the demarcation between individual components and shared components may vary in different embodiments of the present invention. Thus, the present invention should not be construed as limited to the example of FIG. 7.

The analog to digital converter 256 may be a conventional analog to digital converter. The analog to digital converter 256 converts the received analog signal to a digital signal which is provided to the time domain equalizer 258. A single time-domain equalizer may be used, however, the timing coefficients should be selected from multiple client-specific sets. The stored client specific variables 260 may be selected by the equalizer 258 based on the physical line selected by the multiplexer 254. Alternatively, other selection methods may be used, as described with respect to the transmitter portion of the client modem.

The time domain equalizer 258 provides an equalized digital signal to both the Sync Search function 282 and the serial to parallel converter 262. The sync search 282 and parallel to serial converter 262 may be the same as those used in conventional ADSL modems. However, the sync search function 282 may have to be disabled when switching from one client line to another, depending on how quickly switching transients settle out. Ideally, a new client could be transmitting immediately after switching the multiplexer, but at least one physical frame of dead time when switching may be required.

The serial to parallel converter 262 converts the serial digital signal to a parallel digital signal and provides the parallel signal to 64 real symbol buffers 264. The real symbol buffers 264 provide the symbols to the Discrete Fourier Transformation (DFT) function 266 which converts the symbols from the time domain to the frequency domain and provides 32 complex symbols to the complex symbol buffers 268. The DFT 266 may be the same as conventional DFT functions. The complex symbol buffers 268 then provide the symbols to the symbol detector 284.

Like the time-domain equalization 258, the frequency-domain equalization and symbol detection function 284 is dependent on the line characteristics learned for the specific client connection. Therefore, at each processing interval, a set of client specific coefficients and state variables, coordinated with the state of the front-end multiplexer 254, must be used to process the symbols generated by the DFT 266. Otherwise, the symbol detector 284 may function as a convention ADSL symbol detector. The client specific variables 280 may be stored and provided to the symbol detector 284. The selection of the client specific variables 280 may be based on the multiplexer 254 or by other means, as described above.

The symbol detector 284 outputs the symbols to symbol buffers 270 which provide the symbols to the decoder 272. As with the transmitter, the maximum number of symbol buffers 270 required is one for each local loop. The decoder 272 descrambles, Reed-Solomon decodes and de-interleaves the symbols. Descrambling, Reed-Solomon Decoding, and De-interleaving processes should be essentially the same as that required for a single line server modem, since each L2 frame could be processed completely before moving to the next. Some additional complexity may be required to coordinate multiple packet buffers. Tone ordering is dependent on learned line characteristics, and thus must be done differently for each client connection. Therefore, like the symbol detector 284, the decoder 272 will access client specific variables 278 to perform its functions. The selection of the client specific variables 278 may be the same as that described above. A single routine may process multiple connections by accessing the client specific state variables 278.

The decoder outputs packets to the packet buffers 274 which provide the packets to the L2 Framing/CRC check function 276. A single L2 Framing/CRC Check function 276 can be shared among multiple connections. Thus, the L2 Framing/CRC Check function 276 may be essentially the same as required for a single line modem. Each L2 Frame will be processed completely from a packet buffer 274, and placed in a DMA queue before starting the next frame. This avoids a requirement of saving and restoring client specific intermediate results. Supporting multiple connections may require more packet buffers than required for the single line case. FIG. 7 shows separate buffers per connection as an upper limit, but, depending on the mechanism used to control data flow through the physical layer, the number of packet buffers may be reduced significantly below that level. The L2 framing/CRC Check function 276 then provides the packets to the digital interface 200 for transmission.

Figure 8:
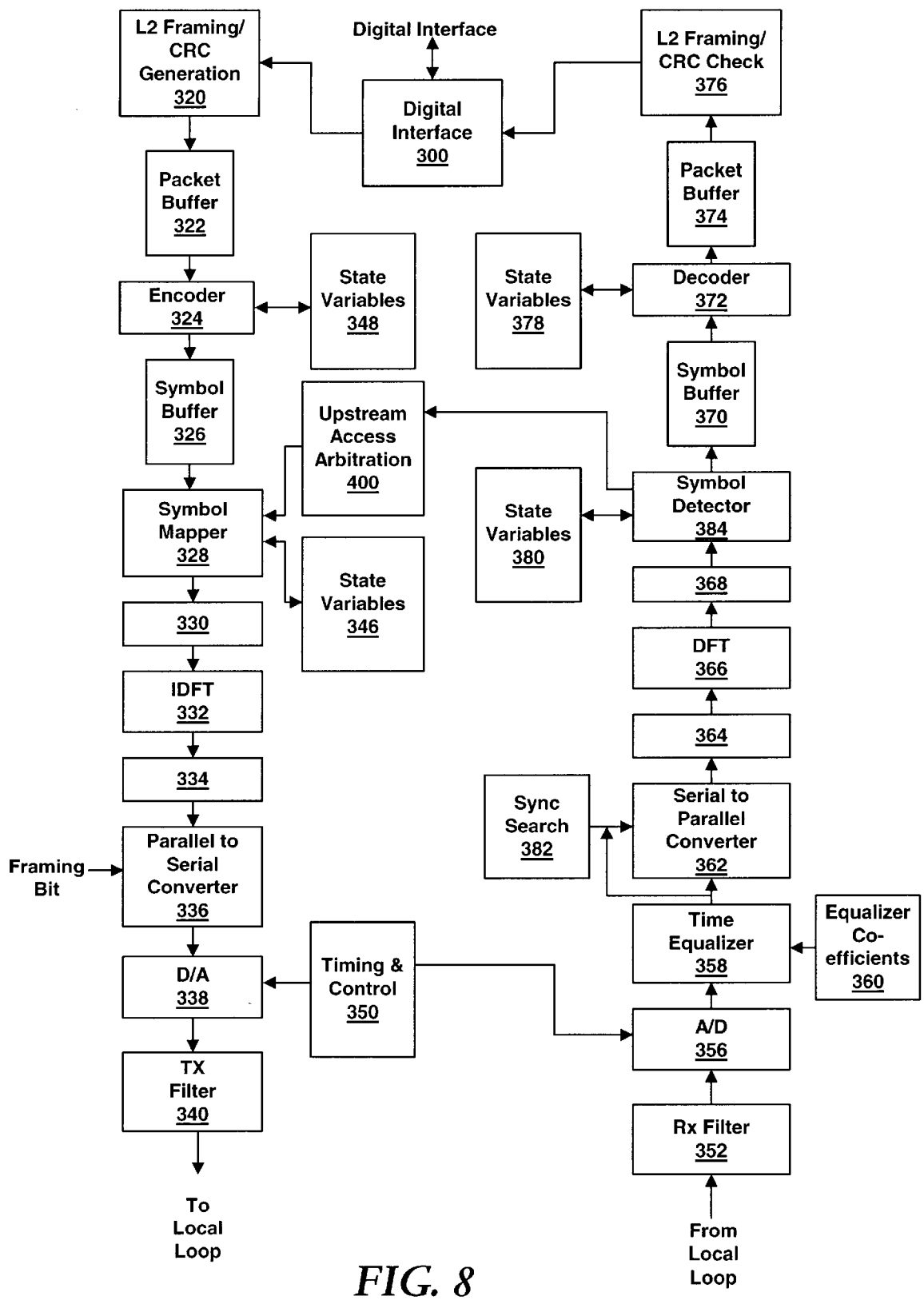
FIG. 8 is a block diagram of a particular embodiment of a client modem according to the present invention.

FIG. 8 illustrates a particular embodiment of a client modem according to the present invention. As seen in FIG. 8, the client ADSL modem according to one embodiment of the present invention includes a digital interface 300 which allows connectivity to any device capable of communicating over the digital interface 300. The digital interface 300 is bidirectional in that it receives data from the receive section of the modem or provides data to the transmitter portion of the modem. The digital interface 300 may be a conventional digital interface for ADSL modems.

The digital interface 300 provides information to a L2 Framing and CRC Generation function 320. The L2 Framing and CRC generation function 320 may be the same as used in conventional ADSL modems. Each L2 Frame will be processed and placed in a packet buffer 322.

The packet buffer 322 provides packets of data to an encoder 324. The encoder 324 scrambles, Reed-Solomon codes and interleaves the packets. Scrambling, Reed-Solomon Encoding, and Interleaving processes should be essentially the same as that required for a conventional single line modem. Tone ordering is dependent on learned line characteristics and utilizes the state variables 348 which are stored and provided to the encoder 324.

After the encoder 324, the resulting symbols are provided to the symbol buffer 326. The symbol buffer 326 provides the symbols to the symbol mapper 328. Symbol mapping and gain scaling are also dependent on learned line characteristics using the state variables 346. The symbol mapper 328 uses the state variables 346 to map the symbols to the frequencies of the multi-tone transmission. The symbol mapper 328 may also receive information from the upstream access arbitration function 400 to be utilized in the arbitration for bandwidth between multiple clients and the shared ADSL modem. Thus, the symbol mapper 328 may be a conventional symbol mapper with the addition of provisions for the particular arbitration or bandwidth allocation scheme employed by the shared ADSL modem. Various such schemes are described below.

The output of the symbol mapper 328 may then be provided to a 32 complex symbol buffer 330 which outputs the complex symbols to the Inverse Discrete Fourier Transform (IDFT) circuit 332. The IDFT 332 of the present invention may be identical to that of a conventional ADSL modem. The IDFT 332 converts the complex symbols to real symbols by converting from the frequency domain to the time domain. The real symbols are provided to a 64 symbol buffer 334 which then provides them to the parallel to serial converter 336 which may insert the framing bit and cyclic prefix. The parallel to serial conversion and insertion of the framing bit and cyclic prefix may be identical to that of a conventional single line ADSL modem.

The parallel to serial converter 336 provides the serial information to the Digital to Analog converter (D/A) 338 which converts the digital signal to an analog signal. The analog signal is provided to the transmit filter 340 which provides the filtered signal to the local loop.

The receiver of FIG. 8 receives signals from the local loop at receive filter 352. The receive filter 352 provides the signal to an analog to digital converter 356. The analog to digital converter 356 may be a conventional analog to digital converter. The analog to digital converter 356 converts the received analog signal to a digital signal which is provided to the time domain equalizer 358. The time-domain equalizer uses stored equalization coefficients 360. A conventional time domain equalizer may be utilized.

The time domain equalizer 358 provides an equalized digital signal to both the Sync Search function 382 and the serial to parallel converter 362. The sync search 382 and serial to parallel converter 362 may be the same as those used in conventional ADSL modems.

The serial to parallel converter 362 converts the serial digital signal to a parallel digital signal and provides the parallel signal to 512 real symbol buffer 364. The real symbol buffer 364 provides the symbols to the Discrete Fourier Transformation (DFT) function 366 which converts the symbols from the time domain to the frequency domain and provides 256 complex symbols to the complex symbol buffer 368. The DFT 366 may be the same as conventional DFT functions. The complex symbol buffer 368 then provides the symbols to the symbol detector 384.

Like the time-domain equalization 358, the frequency-domain equalization and symbol detection function 384 is dependent on the line characteristics learned for the client connection. The symbol detector 384 utilizes the state variables 380 in detecting the symbols. The symbol detector 384 may function as a convention ADSL symbol detector however, the symbol detector also detects whether the message is directed to the specific client modem. Thus, the symbol detector 384 may examine the frequency band(s) allocated to the control channel function, to determine on a frame by frame basis if the set of physical symbols is addressed to that specific client. If not, those frames are discarded and further processing is not necessary during that interval. This process could alternately be done only once per superframe (69 frames), depending on the granularity of the multiplexing. The symbol detector 384 may also provide information to the upstream access arbitration function 400 for use in the arbitration scheme for allocating bandwidth.

If the symbols are for the client modem, the symbol detector 384 outputs the symbols to symbol buffer 370 which provides the symbols to the decoder 372. The decoder 372 performs descrambling, Reed-Solomon decodeing and de-interleaving. The decoder 372 outputs packets to the packet buffer 374 which provide the packets to the L2 Framing/CRC check function 376. The L2 framing/CRC Check function 376 then provides the packets to the digital interface 300 for transmission. The decoder 372 and L2 Framing/CRC check 376 functions may be the same as conventional client modems. Thus, the decoder 372 may use state variables 378 to perform its functions.

As with single line modems, timing must be synchronized between the transmitter D/A converter and the receiver A/D converter this function is performed by the timing and control function 250 of the server modem and timing and control function 350 in the client modem. The synchronization of the converters may be carried out by conventional timing and control functions. Additional control is required in the Multi-line Server to coordinate the sharing of upstream bandwidth. The server must know which client is enabled to transmit during each possible transmit frame, and coordinate the control of the analog multiplexer at the front end to select the active client. These functions are performed by the timing and control function 250 in the server modem and the upstream access arbitration function 400 in the client modem. A control protocol enables each client to request upstream bandwidth without interfering with current transmission, enables each client to quantify its bandwidth requirements, and enables the server to control which client modem will be allowed to transmit at each possible interval.

Fixed allocations, either time multiplexed or frequency multiplexed may be simplest to implement, but would not make optimum use of available bandwidth. Asynchronous access with collision detection is another possibility, but a client may not be able to detect a collision with another client using a different local loop. This would force the server to determine client collisions and request retransmissions. A control message could be broadcast to all clients simultaneously to accomplish this.

In another control approach, bandwidth is separated via Time Division Multiplexing (TDM) between all active clients. A protocol which allows each client to either give up some of the allocated bandwidth or request additional bandwidth on a dynamic basis could then be implemented. Alternatively, only a small percent of the bandwidth would be allocated to each client. This guarantees a periodic channel for communicating requests for additional bandwidth. Access to the bandwidth not allocated to any client can then be granted dynamically by the server based on pending requests.

Each of the above described control methods for allocating bandwidth between clients may be readily implemented by those of skill in the art. Furthermore, other types of control methods known to those of skill in the art may also be used while still benefitting from the teachings of the present invention. Accordingly, the present invention should not be construed as limited to any particular method of allocating bandwidth to clients.

As is clear from the above discussion, the shared ADSL modem of the present invention allows for multiple connections by isolating the local loops and then using local loop dependent information to communicate with the local loops. This local loop dependent information may be stored in various memory devices, registers, latches or other storage devices known to those of skill in the art. Furthermore, as will be appreciated by those of skill in the art, the local loop dependent information may be stored in a central storage area or in individual storage areas associated with each modem function. Accordingly, the present invention should not be limited to any particular storage configuration.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A multi-drop Asymmetrical Digital Subscriber Loop (ADSL) modem, comprising:

at least two sets of digital front end circuitry which allows for the simultaneous connection to at least two local loops having;

a transmit isolation buffer associated with each local loop and which isolates transmitted communication signals of the local loops from each other and which is operably associated with a transmitter portion of the shared DSL modem; and a receive isolation buffer associated with each local loop which isolates received communication signals of the local loops from each other and which is operably associated with a receiver of the shared DSL modem, a shared ADSL modem operably associated with the at least two sets of digital front end circuitry which transmits and receives data to and from the at least two sets of digital front end circuitry; and a digital interface operably associated with the shared DSL modem and which communicates with an external network.

2. An ADSL modem according to claim 1, wherein the at least two sets of digital front end circuitry further comprises:

a receive filter operably associated with a corresponding receive isolation buffer and which filters signals received by the analog front end circuitry.

3. An ADSL modem according to claim 2, wherein the shared ADSL modem further comprises:

a receiver, wherein the receiver comprises:

a multiplexer which receives an output of the receive filter of each local loop and which provides one of the outputs of one of the receive filters as a multiplexer output; and an analog-to-digital converter which receives the multiplexer output and converts the multiplexer output to a digital signal.

4. An ADSL modem according to claim 3, further comprising a circuit for controlling an initial handshake mechanism for determining optimum transmission parameters for each client modem independent of other client modems.

5. An ADSL modem according to claim 4 wherein the receiver further comprises:

a timing equalizer which utilizes local loop specific equalizer information to equalize the digital signal from the analog-to-digital converter and to time-domain equalize the digital signal to provide an equalized digital signal; and a memory device operably associated with the timing equalizer which stores local loop specific equalizer coefficients.

6. An ADSL modem according to claim 5, wherein the receiver further comprises:

a serial to parallel converter which converts the equalized digital signal from a serial signal to a parallel signal so as to provide a parallel digital signal;

a Discrete Fourier Transform circuit for transforming the parallel digital signal from a time domain signal to a frequency domain signal so as to provide digital frequency coefficients; and a symbol detector which receives the digital frequency coefficients and detects symbols from the frequency domain coefficients based on local loop specific symbol information to provide client specific symbols; and a memory device operably associated with the symbol detector which stores local loop specific symbol information.

7. An ADSL modem according to claim 6, wherein the receiver further comprises:

a decoder which receives the client specific symbols from the symbol detector and which descrambles, provides Reed-Solomon decoding and de-interleaves the symbols based on client specific information to provide client specific data; and a memory device operably associated with the decoder which stores the client specific information.

8. An ADSL modem according to claim 7 further comprising a symbol buffer for each local loop wherein the symbol buffer receives symbols from the symbol detector and provides symbols to the decoder.

9. An ADSL modem according to claim 7, further comprising a packet buffer for each local loop which receives packets from the decoder.

10. An ADSL modem according to claim 1, further comprising a transmitter, wherein the transmitter comprises:

an encoder which receives the client specific symbols for transmission on a local loop and which scrambles, provides Reed-Solomon encoding and interleaves the symbols based on client specific information to provide client specific symbol data; and a memory device operably associated with the decoder which stores the client specific information.

11. An ADSL modem according to claim 10, wherein the transmitter further comprises:

a symbol mapper which receives the client specific symbol data an maps the client specific symbol data to the frequency domain based on local loop specific frequency information to provide local loop specific symbol data; and a memory device operably associated with the symbol mapper which stores local loop specific frequency information.

12. An ADSL modem according to claim 11 further comprising a symbol buffer for each local loop wherein the symbol buffer receives symbols from the encoder and provides symbols to the symbol mapper.

13. An ADSL modem according to claim 11, further comprising a packet buffer for each local loop which receives packets and provides the packets to the encoder.

14. An ADSL modem according to claim 11, wherein the transmitter further comprises:

an Inverse Discrete Fourier Transform circuit for transforming the local loop specific symbol data from frequency domain data to a time domain signal so as to provide parallel digital symbol data; and a parallel to serial converter which converts the parallel digital symbol data from a parallel signal to a serial signal so as to provide a serial digital signal;

a digital to analog converter which converts the serial digital signal to an analog signal;

a transmit filter which filter the analog signal to provides a filtered transmit signal to the transmit isolation buffers.

15. An ADSL modem according to claim 2, wherein the plurality of digital front end circuitry further comprises a sample and hold circuit associated with each receive filter and which receives filtered signals from the corresponding receive filter.

16. An ADSL modem according to claim 15, wherein the shared ADSL modem further comprises:

a receiver, wherein the receiver comprises:

a multiplexer which receives an output of the sample and hold circuit of each local loop and which provides one of the outputs of one of the sample and hold circuits as a multiplexer output; and an analog-to-digital converter which receives the multiplexer output and converts the multiplexer output to a digital signal.

17. An ADSL modem according to claim 16, further comprising a circuit for controlling an initial handshake mechanism for determining optimum transmission parameters for each client modem independent of other client modems.

18. An ADSL modem according to claim 17 wherein the receiver further comprises:
- a timing equalizer which utilizes local loop specific equalizer information to equalize the digital signal from the analog-to-digital converter and to time-domain equalize the digital signal to provide an equalized digital signal; and
- a memory device operably associated with the timing equalizer which stores local loop specific equalizer coefficients.

19. An ADSL modem according to claim 18, wherein the receiver further comprises:
- a serial to parallel converter which converts the equalized digital signal from a serial signal to a parallel signal so as to provide a parallel digital signal;
- a Discrete Fourier Transform circuit for transforming the parallel digital signal from a time domain signal to a frequency domain signal so as to provide digital frequency coefficients; and
- a symbol detector which receives the digital frequency coefficients and detects symbols from the frequency domain coefficients based on local loop specific symbol information to provide client specific symbols; and
- a memory device operably associated with the symbol detector which stores local loop specific symbol information.

20. An ADSL modem according to claim 19, wherein the receiver further comprises:
- a decoder which receives the client specific symbols from the symbol detector and which descrambles, provides Reed-Solomon decoding and de-interleaves the symbols based on client specific information to provide client specific data; and
- a memory device operably associated with the decoder which stores the client specific information.

21. An ADSL modem according to claim 20 further comprising a symbol buffer for each local loop wherein the symbol buffer receives symbols from the symbol detector and provides symbols to the decoder.

22. An ADSL modem according to claim 20, further comprising a packet buffer for each local loop which receives packets from the decoder.

23. An ADSL modem according to claim 15, further comprising a transmitter, wherein the transmitter comprises:
- an encoder which receives the client specific symbols for transmission on a local loop and which scrambles, provides Reed-Solomon encoding and interleaves the symbols based on client specific information to provide client specific symbol data; and
- a memory device operably associated with the decoder which stores the client specific information.

24. An ADSL modem according to claim 23, wherein the transmitter further comprises:
- a symbol mapper which receives the client specific symbol data an maps the client specific symbol data to the frequency domain based on local loop specific frequency information to provide local loop specific symbol data; and
- a memory device operably associated with the symbol mapper which stores local loop specific frequency information.

25. An ADSL modem according to claim 24, wherein the transmitter further comprises:
- an Inverse Discrete Fourier Transform circuit for transforming the local loop specific symbol data from frequency domain data to a time domain signal so as to provide parallel digital symbol data; and
- a parallel to serial converter which converts the parallel digital symbol data from a parallel signal to a serial signal so as to provide a serial digital signal;
- a digital to analog converter which converts the serial digital signal to an analog signal;
- a transmit filter which filter the analog signal to provides a filtered transmit signal to the transmit isolation buffers.

26. An ADSL modem according to claim 25 further comprising a symbol buffer for each local loop wherein the symbol buffer receives symbols from the encoder and provides symbols to the symbol mapper.

27. An ADSL modem according to claim 25, further comprising a packet buffer for each local loop which receives packets an provides packets to the encoder.

28. An ADSL modem according to claim 15, wherein the at least two sets of digital front end circuitry further comprises an analog to digital converter associated with each sample and hold circuit which receives a held signal from the corresponding sample and hold circuit and converts the analog signal to a digital signal.

29. An ADSL modem according to claim 28, wherein the shared ADSL modem further comprises:
- a receiver, wherein the receiver comprises:
  - a multiplexer which receives an output of the analog to digital converter of each local loop and which provides one of the outputs of one of the analog to digital converters as a multiplexer output; and
  - a timing equalizer which utilizes local loop specific equalizer information to equalize the digital signal from the multiplexer output and to time-domain equalize the digital signal to provide an equalized digital signal; and
  - a memory device operably associated with the timing equalizer which stores local loop specific equalizer coefficients.

30. An ADSL modem according to claim 29, further comprising a circuit for controlling an initial handshake mechanism for determining optimum transmission parameters for each client modem independent of other client modems.

31. An ADSL modem according to claim 30, wherein the receiver further comprises:
- a serial to parallel converter which converts the equalized digital signal from a serial signal to a parallel signal so as to provide a parallel digital signal;
- a Discrete Fourier Transform circuit for transforming the parallel digital signal from a time domain signal to a frequency domain signal so as to provide digital frequency coefficients; and
- a symbol detector which receives the digital frequency coefficients and detects symbols from the frequency domain coefficients based on local loop specific symbol information to provide client specific symbols; and
- a memory device operably associated with the symbol detector which stores local loop specific symbol information.

32. An ADSL modem according to claim 31, wherein the receiver further comprises:
- a decoder which receives the client specific symbols from the symbol detector and which descrambles, provides Reed-Solomon decoding and de-interleaves the symbols based on client specific information to provide client specific data; and a memory device operably associated with the decoder which stores the client specific information.

33. An ADSL modem according to claim 32 further comprising a symbol buffer for each local loop wherein the symbol buffer receives symbols from the symbol detector and provides symbols to the decoder.

34. An ADSL modem according to claim 22, further comprising a packet buffer for each local loop which receives packets from the decoder.

35. An ADSL modem according to claim 28, further comprising a transmitter, wherein the transmitter comprises:

an encoder which receives the client specific symbols for transmission on a local loop and which scrambles, provides Reed-Solomon encoding and interleaves the symbols based on client specific information to provide client specific symbol data; and a memory device operably associated with the decoder which stores the client specific information.

36. An ADSL modem according to claim 35, wherein the transmitter further comprises:

a symbol mapper which receives the client specific symbol data an maps the client specific symbol data to the frequency domain based on local loop specific frequency information to provide local loop specific symbol data; and a memory device operably associated with the symbol mapper which stores local loop specific frequency information.

37. An ADSL modem according to claim 36, wherein the transmitter further comprises:

an Inverse Discrete Fourier Transform circuit for transforming the local loop specific symbol data from frequency domain data to a time domain signal so as to provide parallel digital symbol data; and a parallel to serial converter which converts the parallel digital symbol data from a parallel signal to a serial signal so as to provide a serial digital signal;

a digital to analog converter which converts the serial digital signal to an analog signal;

a transmit filter which filter the analog signal to provides a filtered transmit signal to the transmit isolation buffers.

38. An ADSL modem according to claim 37 further comprising a symbol buffer for each local loop wherein the symbol buffer receives symbols from the encoder and provides symbols to the symbol mapper.

39. An ADSL modem according to claim 37, further comprising a packet buffer for each local loop which receives packets and provides packets to the encoder.

40. A system for allowing multiple simultaneous local loops to connect to a single ADSL modem, comprising:

means for isolating the local loops from one another;

means for storing loop dependent information for each connected local loop coonected to the singel ADSL modem; and means for communicating with each local loop using the single ADSL modem utilizing the loop dependent information.

41. A computer program product for allowing multiple simultaneous local loops to connect to a single ADSL modem, the computer program product comprising a computer usable storage medium having computer readable program code means embodied in the medium, the computer readable program code means comprising:

computer readable program code means for isolating the local loops from one another;

computer readable program code means for storing loop dependent information for each connected local loop that is connected to the single ADSL modem; and computer readable program code means for communicating with each local loop using the single ADSL modemutilizing the loop dependent information.

* * * * *